(12) United States Patent
Zeng et al.

(10) Patent No.: US 12,142,787 B2
(45) Date of Patent: Nov. 12, 2024

(54) BATTERY, ELECTRIC APPARATUS, AND METHOD AND DEVICE FOR PREPARING BATTERY

(71) Applicant: JIANGSU CONTEMPORARY AMPEREX TECHNOLOGY LIMITED, Changzhou (CN)

(72) Inventors: Yuqun Zeng, Changzhou (CN); Xiaoteng Huang, Changzhou (CN); Haiqi Yang, Changzhou (CN); Jiarong Hong, Changzhou (CN); Langchao Hu, Changzhou (CN); Wenli Wang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 378 days.

(21) Appl. No.: 17/842,781

(22) Filed: Jun. 17, 2022

(65) Prior Publication Data
US 2022/0320680 A1    Oct. 6, 2022

Related U.S. Application Data

(63) Continuation of application No. PCT/CN2020/121997, filed on Oct. 19, 2020.

(51) Int. Cl.
*H01M 50/383* (2021.01)
*H01M 50/342* (2021.01)
*H01M 50/375* (2021.01)

(52) U.S. Cl.
CPC ..... *H01M 50/383* (2021.01); *H01M 50/3425* (2021.01); *H01M 50/375* (2021.01); *H01M 2220/20* (2013.01)

(58) Field of Classification Search
None
See application file for complete search history.

(56) References Cited

U.S. PATENT DOCUMENTS

| 2012/0237803 A1 | 9/2012 | Mardall et al. |
| 2020/0287180 A1 | 9/2020 | Chen et al. |

FOREIGN PATENT DOCUMENTS

| CN | 102376901 A | 3/2012 |
| CN | 103098262 A | 5/2013 |

(Continued)

OTHER PUBLICATIONS

Machine Translation of Chinese Patent Publication No. 209662489 (Year: 2019).*

(Continued)

*Primary Examiner* — Wyatt P McConnell
(74) *Attorney, Agent, or Firm* — ANOVA LAW GROUP, PLLC

(57) ABSTRACT

A battery includes a battery cell provided with a pressure relief mechanism configured to be actuated in response to internal pressure or temperature in the battery cell reaching a threshold to release the internal pressure, a collection pipe configured to accommodate a firefighting medium, and a firefighting pipe configured to connect to the collection pipe to allow the firefighting medium to be fed to the firefighting pipe. The firefighting pipe is configured to discharge the firefighting medium toward the battery cell in response to the pressure relief mechanism being actuated. Two ends of the firefighting pipe are a first end and a second end respectively. The first end is configured to connect to the collection pipe to allow the firefighting medium to enter the firefighting pipe through the first end, and the second end is closed.

14 Claims, 10 Drawing Sheets

(56) References Cited

FOREIGN PATENT DOCUMENTS

| | | |
|---|---|---|
| CN | 106711371 A | 5/2017 |
| CN | 206295526 U | 7/2017 |
| CN | 108799626 A | 11/2018 |
| CN | 209071461 A | 7/2019 |
| CN | 110190212 A | 8/2019 |
| CN | 110199406 A | 9/2019 |
| CN | 209662489 U | 11/2019 |
| CN | 209804782 U | 12/2019 |
| CN | 111430826 A | 7/2020 |
| CN | 211017157 U | 7/2020 |
| CN | 111509163 A | 8/2020 |
| CN | 111554850 A | 8/2020 |
| CN | 111613745 A | 9/2020 |
| JP | 2015134067 A | 7/2015 |
| JP | 2017501550 A | 1/2017 |
| JP | 2017189068 A | 10/2017 |
| JP | 2018063765 A | 4/2018 |
| KR | 102123685 B1 | 6/2020 |
| WO | 2015045195 A1 | 4/2015 |

OTHER PUBLICATIONS

The European Patent Office (EPO) The Extended European Search Report for Application No. 20957977.0 Aug. 30, 2023 10 Pages.
The European Patent Office (EPO) Communication under Rule 71(3) EPC for Application No. 20957977.0 May 3, 2024 56 Pages.
Japan Patent Office (JPO) The Notice of Reasons for Refusal For JP Application No. 2022-540536 Jul. 24, 2023 12 Pages (Translation Included).
The China National Intellectual Property Administration (CNIPA) Notification to Grant Patent Right for Invention 202011120232.2 Nov. 2, 2022 9 Pages (including Translation).
The World Intellectual Property Organization (WIPO) International Search Report and Written Opinion for PCT/CN2020/121997 Jul. 20, 2021 17 pages (including Translation).
The China National Intellectual Property Administration (CNIPA) The First Office Action for Chinese Application 202011120232.2 Jun. 6, 2022 20 Pages (including Translation).

* cited by examiner

BATTERY, ELECTRIC APPARATUS, AND METHOD AND DEVICE FOR PREPARING BATTERY

CROSS-REFERENCE TO RELATED APPLICATION

This application is a continuation of International Application No. PCT/CN2020/121997, filed Oct. 19, 2020, the entire content of which is incorporated herein by reference.

TECHNICAL FIELD

This application relates to the field of battery technologies, and in particular, to a battery, an electric apparatus, a method for preparing a battery, and a device for preparing a battery.

BACKGROUND

As an important new power source, batteries have received more and more attention. In order to reduce the hazard of spontaneous combustion of a battery due to thermal runaway during use of the battery, an existing firefighting system is usually added to the battery to play a firefighting role in the event of battery combustion.

However, as temperature of the battery changes during use, it is likely to produce condensed water on exterior wall of the firefighting system, and the condensed water in turn is apt to cause a short circuit in a conductive component of a battery cell.

SUMMARY

This application provides a battery, an electric apparatus, a method for preparing a battery, and a device for preparing a battery, which can reduce or avoid production of condensed water, thereby reducing or avoiding short circuit in a battery cell.

A first aspect of this application provides a battery, including:
- a battery cell, provided with a pressure relief mechanism, where the pressure relief mechanism is configured to be actuated when internal pressure or temperature in the battery cell reaches a threshold, to release the internal pressure;
- a collection pipe, configured to accommodate a firefighting medium; and
- a firefighting pipe, configured to connect to the collection pipe to allow the firefighting medium to be fed to the firefighting pipe, where the firefighting pipe is configured to discharge the firefighting medium toward the battery cell when the pressure relief mechanism is actuated, and
- two ends of the firefighting pipe are a first end and a second end respectively, the first end is configured to connect to the collection pipe to allow the firefighting medium to enter the firefighting pipe through the first end, and the second end is closed.

In some embodiments, the second end of the firefighting pipe is closed by using a first closure cap.

In some embodiments, the second end has an opening, the first closure cap includes an end wall and a side wall that are joined, the end wall is configured to block the opening, and the side wall is arranged around the periphery of the opening, the side wall is configured to hermetically engage with a pipe wall of the second end to seal the opening.

In some embodiments, the firefighting pipe is configured to be broken by emissions from the battery cell when the pressure relief mechanism is actuated, so that the firefighting medium is discharged and enters the battery cell through the pressure relief mechanism.

In some embodiments, the firefighting pipe has a weak portion, and the weak portion is configured to be broken by the emissions when the pressure relief mechanism is actuated.

In some embodiments, the firefighting pipe is provided in plurality, and a plurality of the firefighting pipes are arranged spaced apart from each other on one side or two sides of the collection pipe; and the battery cell is provided in plurality, a plurality of the battery cells are arranged as at least two battery modules, each of the battery modules includes at least one battery cell, and the pressure relief mechanism of the battery cell in each battery module is disposed facing one of the firefighting pipes.

In some embodiments, the battery module includes a plurality of battery cells arranged in a predetermined direction, and a length direction of the firefighting pipe is identical to the arrangement direction of the plurality of battery cells.

In some embodiments, a length direction of the collection pipe forms a preset included angle with the arrangement direction.

In some embodiments, two ends of the collection pipe are a third end and a fourth end respectively, the third end is configured to input the firefighting medium, and the fourth end is closed.

In some embodiments, the fourth end of the collection pipe is closed by using a second closure cap.

In some embodiments, the firefighting pipe is higher than the collection pipe in a direction of gravity, so as to block the firefighting medium in the collection pipe when the pressure relief mechanism is not actuated.

In some embodiments, the battery further includes a supporting member, configured to support the collection pipe.

In some embodiments, the supporting member has a supporting arm, and the supporting arm is configured to support the pipe wall of the collection pipe facing the battery cell.

In some embodiments, the supporting arms are arranged in pairs, and pairs of the supporting arms are arranged spaced apart from each other, a protruding portion is provided at the pipe wall of the collection pipe facing the battery cell, the protruding portion is configured to insert between pairs of the supporting arms, and two sides of the protruding portion are supported by the pairs of the supporting arms.

In some embodiments, the battery further includes a restraint member, configured to restrict the collection pipe in between adjacent battery modules.

In some embodiments, the restraint member includes a restraint wall and legs connected to the restraint wall.

The restraint wall is over the collection pipe, and configured to restrict the collection pipe from moving in a direction leaving the battery cell.

The legs are configured to support the restraint wall, and located between the collection pipe and the battery module to restrict the collection pipe.

In some embodiments, the legs are arranged in pairs, pairs of the legs are arranged spaced apart from each other, and the collection pipe is restricted in between pairs of the legs.

In some embodiments, the restraint wall abuts against the pipe wall of the collection pipe.

In some embodiments, the restraint wall has an arc portion, and the arc portion protrudes toward the collection pipe to abut against the pipe wall of the collection pipe.

In some embodiments, the leg is provided with a clamping portion, and the clamping portion protrudes toward the collection pipe to restrict the collection pipe.

In some embodiments, the clamping portion abuts against the pipe wall of the collection pipe.

In some embodiments, the clamping portion is constructed as a cantilever structure.

In some embodiments, the battery further includes a thermal management component, configured to adjust temperature of the battery cell, and the thermal management component is configured to connect to the collection pipe to feed the firefighting medium to the collection pipe.

According to a second aspect of this application, an electric apparatus is provided, including the battery cell according to the foregoing embodiments, where the battery cell is configured to provide electric energy.

According to a third aspect of this application, a method for preparing a battery is provided and includes:
  providing a battery cell, where the battery cell is provided with a pressure relief mechanism, and the pressure relief mechanism is configured to be actuated when internal pressure or temperature in the battery cell reaches a threshold, to release the internal pressure;
  providing a collection pipe configured to accommodate a firefighting medium; and
  connecting a firefighting pipe to the collection pipe to allow the firefighting medium to be fed to the firefighting pipe, where the firefighting pipe is configured to discharge the firefighting medium toward the battery cell when the pressure relief mechanism is actuated, and
  two ends of the firefighting pipe are a first end and a second end respectively, the first end is connected to the collection pipe to allow the firefighting medium to enter the firefighting pipe through the first end, and the second end is closed.

According to a fourth aspect of this application, a device for preparing a battery is provided and includes:
  a first apparatus, configured to provide a battery cell, where the battery cell is provided with a pressure relief mechanism, and the pressure relief mechanism is configured to be actuated when internal pressure or temperature in the battery cell reaches a threshold, to release the internal pressure;
  a second apparatus, configured to provide a collection pipe configured to accommodate a firefighting medium; and
  a third apparatus, configured to connect a firefighting pipe to the collection pipe to allow the firefighting medium to be fed to the firefighting pipe, where the firefighting pipe is configured to discharge the firefighting medium toward the battery cell when the pressure relief mechanism is actuated; and
  two ends of the firefighting pipe are a first end and a second end respectively, the third apparatus is configured to connect the first end with the collection pipe to allow the firefighting medium to enter the firefighting pipe through the first end, and the third apparatus is further configured to close the second end.

In the battery provided in the embodiments of this application, in one aspect, the collection pipe is arranged such that the firefighting medium can be accommodated in the collection pipe, and the first end of the firefighting pipe is connected to the collection pipe to allow the firefighting medium to be fed to the firefighting pipes when firefighting is required, and this may not only implement firefighting, but also facilitate breakage of the firefighting pipe when the pressure relief mechanism is actuated, thereby improving firefighting timeliness. In another aspect, closure of the second end of the firefighting pipe can prevent the firefighting medium from flowing in the firefighting pipe when the pressure relief mechanism is not actuated, thereby reducing difference between inside and outside temperatures of the firefighting pipe, and reducing condensed water produced on the exterior of the pipe wall of the firefighting pipe, to resolve the problem of short circuit in the battery cell caused by the condensed water, which can prolong service life of the battery.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show some embodiments of this application, and persons of ordinary skill in the art may still derive other drawings from these accompanying drawings without creative efforts.

The drawings described herein are intended for a further understanding of this application and constitute a part of this application. Example embodiments of this application and descriptions thereof are intended to explain this application, and do not constitute any inappropriate limitation on this application.

DESCRIPTION OF EMBODIMENTS

Figure 1A:
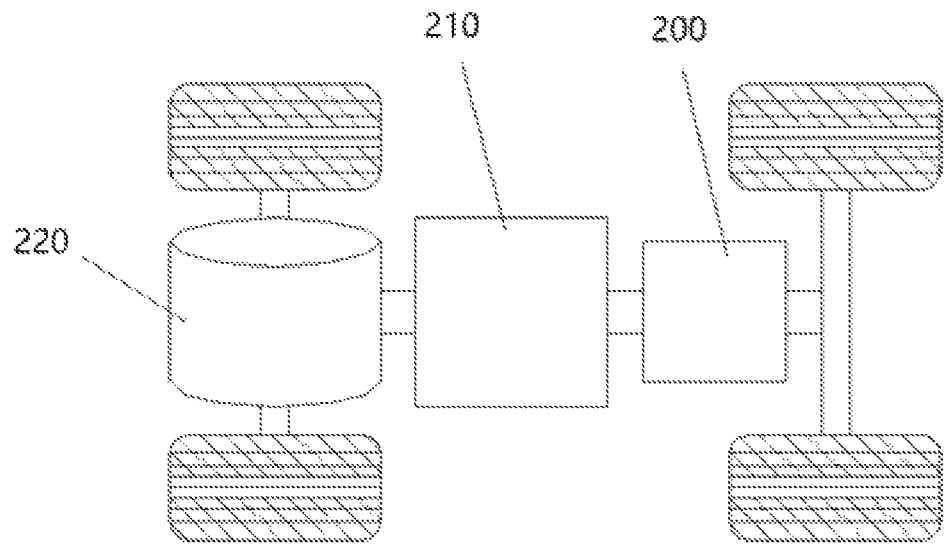
FIG. 1A is a schematic structural diagram of an electric apparatus according to an embodiment of this application.

To make the objectives, technical solutions, and advantages of this application more comprehensible, the following describes this application in detail with reference to embodiments and accompanying drawings. It should be understood that the specific embodiments described herein are merely intended to explain this application, are some embodiments of this application, but are not intended to limit the protection scope of this application. Therefore, any equivalent changes made in accordance with the structure, shape, or principle should fall within the scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application. The terms "include", "comprise", and "having" and any other variations thereof in the specification, the claims and the brief description of drawings of this application are intended to cover a non-exclusive inclusion.

The term "embodiment" described herein means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with another embodiment.

The term "and/or" in this specification is only an associative relationship for describing associated objects, indicating that three relationships may exist. For example, A and/or B may indicate three scenarios: A alone; A and B; and B alone. In addition, a character "/" in this specification generally indicates an "or" relationship between contextually associated objects.

In addition, the terms "first", "second" and the like in the specification and the claims or the above accompanying drawings of this application are used to distinguish between different objects but not describe a specific sequence, and can explicitly or implicitly include one or more features.

In the descriptions of this application, unless otherwise specified, "plurality" means two or more than two. Likewise, "plurality of groups" means two or more than two groups.

In the descriptions of this application, it should be noted that, unless otherwise specified and defined explicitly, the terms "installed", "connected" and "connection" should be understood broadly. For example, "connected" or "connection" of a mechanical structure may indicate physical connection. For example, the physical connection may be fixed connection, for example, fixed connection by using a fixing member such as a screw, a bolt or other fixing members; or the physical connection may be detachable connection, for example, connection by mutual clamping or clamping; or the physical connection may be an integral connection, for example, connection by welding, bonding or integral forming. "Connected" or "connection" of a circuit structure may indicate physical connection, and may also indicate electrical connection or signal connection, for example, may be direct connection, that is, the physical connection, may be indirect connection by using at least one element in between as long as circuit communication is implemented, and may also be communication between two elements; and the signal connection may be signal connection by using a circuit, and may also be signal connection by using a media medium, such as a radio wave. Persons of ordinary skill in the art may understand specific meanings of the preceding terms in the embodiments of this application based on a specific situation.

To clearly describe orientations in the following embodiments, some orientational words may be used. For example, in a coordinate system in FIG. 1D, a direction X represents a length direction of the battery cell 400; a direction Y is perpendicular to the direction X in a horizontal plane, and represents a width direction of the battery cell 400; and a direction Z is perpendicular to the direction X and the direction Y, and represents a height direction of the battery. In addition, the above described expressions such as the direction X, the direction Y, and the direction Z that are used to describe operations and constructions of various members of the battery in the embodiments are relative rather than absolute. Although these indications are appropriate when the members of the battery are located and oriented as shown in the drawings, these directions may be interpreted differently when the positions and/or orientations change, to reflect the changes.

Based on the same orientation understanding, in the descriptions of this application, the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as any limitation on this application.

A rechargeable battery may be a secondary battery or a traction battery. Currently, the most widely used rechargeable battery is a lithium battery, such as a lithium-sulfur battery, a sodium-lithium-ion battery, or a magnesium-ion battery, but it is not limited thereto. For ease of description, the chargeable battery herein can be collectively referred to as a battery.

The safety characteristic of batteries is important for measuring battery performance. It is needed to ensure the battery safety as much as possible when the battery is being used or charged.

A battery generally includes a plurality of battery cells that are connected. In a case that an external short circuit, overcharge, nail penetration, plate impact, or the like occurs on a battery cell, this battery cell is prone to thermal runaway. When thermal runaway occurs, emissions are produced in the battery cell, and the emissions include high-temperature exhaust gas (with flames in severe cases), volatilized high-temperature electrolyte, and other substances. Thermal diffusion takes place when the emissions are discharged, resulting in that thermal runaway occurs in other battery cells, or even explosions and other accidents.

In terms of thermal runaway in a battery cell, currently a valid solution is to provide a firefighting system. When thermal runaway occurs in the battery cell, the firefighting system performs its function to prevent or delay explosion or firing of the battery cell. The firefighting system generally is provided with firefighting pipes configured to accommodate a firefighting medium, the firefighting pipe is disposed over the battery cells, and the firefighting medium can circulate in the firefighting pipe. The firefighting pipe is provided with a plurality of fluid outlets, and each fluid outlet is disposed facing a pressure relief mechanism of the battery cell. When thermal runaway occurs in the battery cell, the firefighting medium can be spewed out from the fluid outlet of the firefighting pipe, achieving the firefighting purpose. However, the inventors have discovered through long-term research that during circulation of the firefighting medium of the firefighting system in the firefighting pipe, because temperature of the firefighting medium is relatively low with respect to that of the battery cell in the battery, when temperature of the battery cell changes, especially when it rises, it is very likely to produce condensed water on the exterior of a pipe wall of the firefighting pipe due to a difference between inside and outside temperatures of the firefighting pipe. When a large amount of condensed water is formed, the condensed water is likely to flow onto a conductive component of a battery cell, causing the battery cell to short-circuit and fail, thereby affecting normal use of the battery.

In view of this, this application provides a battery with a structure of firefighting pipes changed, so that a firefighting medium in the firefighting pipe cannot be circulated, to reduce condensed water produced on the exterior of a pipe wall of the firefighting pipe, thereby reducing a risk of short circuit caused by the condensed water. Therefore, the battery of this application not only can control the situation in which thermal runaway occurs in a battery cell, preventing the battery cell from further generating heat and high-temperature emissions, but also can reduce condensed water produced on the exterior of the pipe wall of the firefighting pipe in the firefighting system, reducing a risk of short circuit in the battery cell caused by condensation.

The battery in the embodiments of this application may be applied to various electric apparatuses that can provide power sources with electrical energy. The electric apparatuses herein may be, but are not limited to, electric vehicles, electric trains, electric bicycles, golf carts, drones, or ships. In addition, the electric apparatuses may be apparatuses that use only battery to provide power, or may be hybrid engine apparatuses. The battery provides electric energy for the electric apparatuses, and drives the electric apparatuses through a motor.

For example, FIG. 1A is a schematic structural diagram of an electric apparatus according to an embodiment of this application. The electric apparatus may be a vehicle. The vehicle may be a fossil fuel vehicle, a natural gas vehicle, or a new energy vehicle. The new energy vehicle may be a battery electric vehicle, a hybrid engine vehicle, a range-extended electric vehicle, or the like. The vehicle includes a battery 200, a controller 210, and a motor 220. The battery 200 is configured to supply power to the controller 210 and the motor 220 as an operational power supply and a driving power supply of the vehicle. For example, the battery 200 is configured to supply power to meet the start, navigation, and operation requirements of the vehicle. For example, the battery 200 supplies power to the controller 210. The controller 210 controls the battery 200 to supply power to the motor 220. The motor 220 receives and uses the power of the battery 200 as the driving power supply of the vehicle, to replace or partially replace fuel oil or natural gas to provide driving power to the vehicle.

Figure 1B:
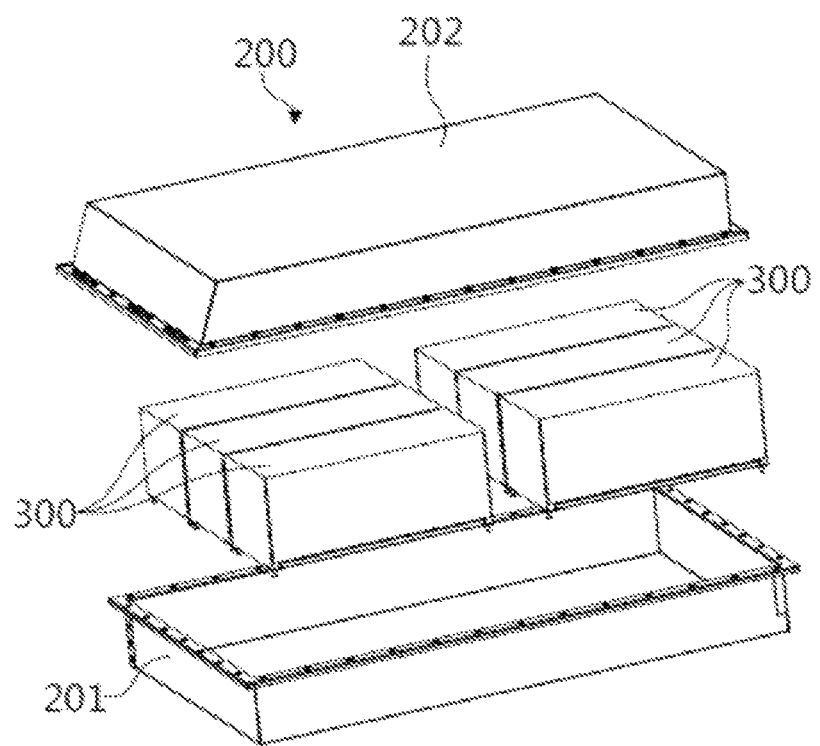
FIG. 1B is a schematic structural diagram of a battery according to an embodiment of this application.

In order to make the battery achieve relatively high functions to meet use demands, the battery 200 may include a plurality of battery modules that are electrically interconnected. As shown in FIG. 1B, the battery 200 includes a first box body 201, a second box body 202, and a plurality of battery modules 300, where the first box body 201 and the second box body 202 are snap-fitted with each other, and the plurality of battery modules 300 are arranged in a space enclosed by the first box body 201 and the second box body 202. In some embodiments, the first box body 201 and the second box body 202 are hermetically connected.

Figure 1C:
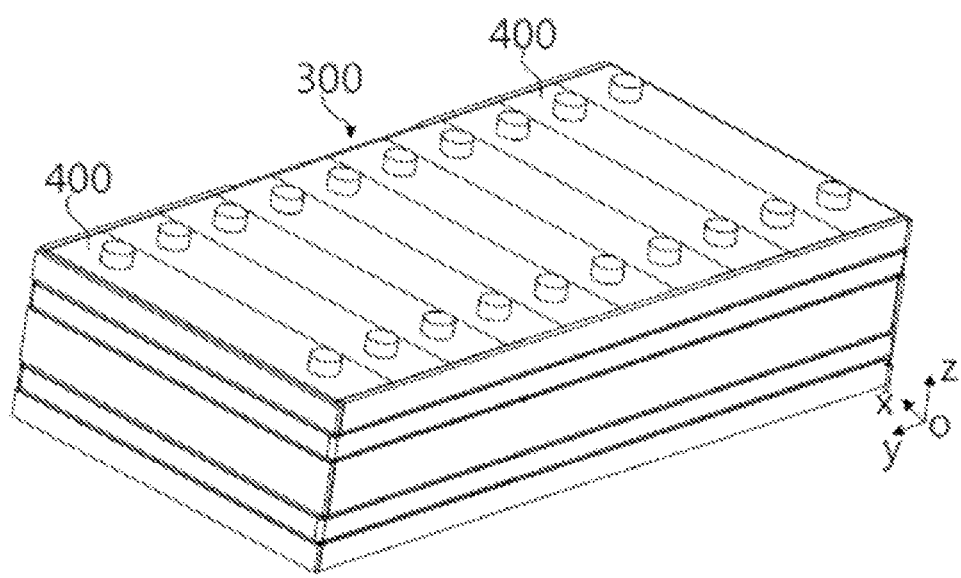
FIG. 1C is a schematic structural diagram of a battery module according to an embodiment of this application.

As shown in FIG. 1C, the battery module 300 includes a plurality of battery cells 400, and the plurality of battery cells 400 may be electrically connected in series, parallel, or series and parallel to achieve a larger current or voltage, and being connected in series and parallel refers to a combination of series and parallel connections. For example, as shown in FIG. 1C, the battery cells 400 may be placed vertically, a height direction of the battery cells 400 coincides with a vertical direction, and the plurality of battery cells 400 are arranged side by side in a width direction. Alternatively, the battery cells 400 may be laid flat, the width direction of the battery cells 400 coincides with the vertical direction, the plurality of battery cells 400 may be stacked in at least one layer in the width direction, and each layer includes a plurality of battery cells 400 arranged in a length direction.

To make persons skilled in the art clearly understand the improvements in this application, an overall structure of the battery cell 400 is described first.

Figure 1D:
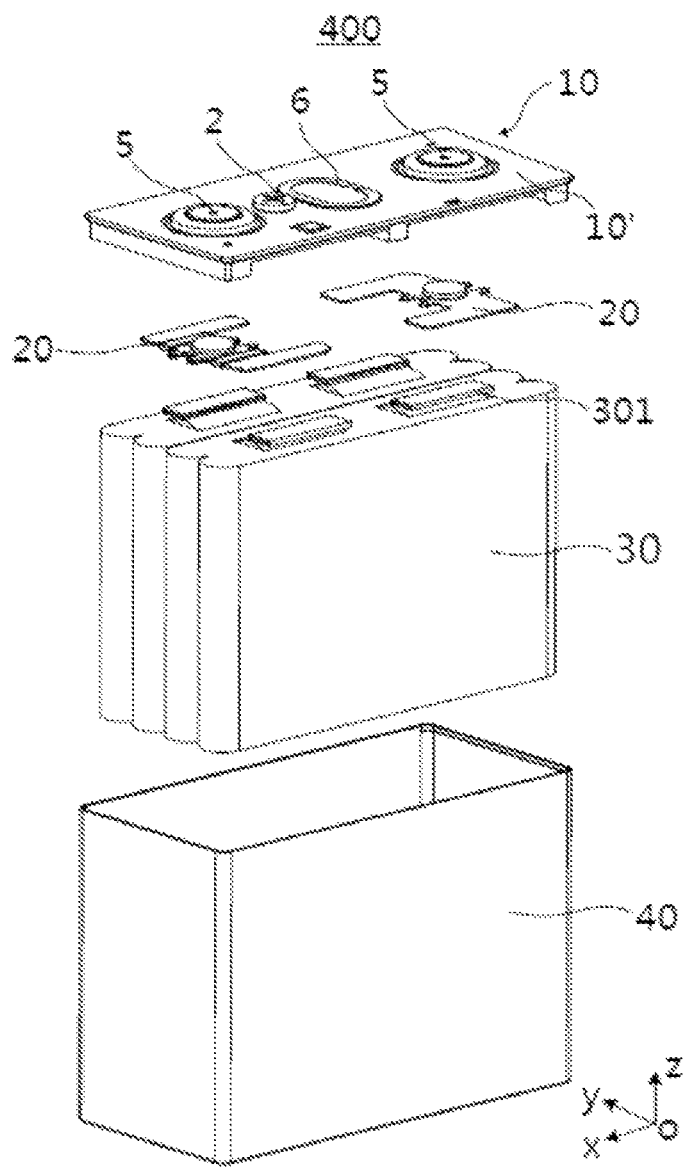
FIG. 1D is a schematic structural diagram of a battery cell according to an embodiment of this application.

As shown in FIG. 1D, the battery cell 400 includes a housing 40, an electrode assembly 30, and an end cap assembly 10. The end cap assembly 10 includes an end cap plate 10'. The end cap plate 10' is connected (for example, welded) to the housing 40 to form a shell of the battery cell 400. The electrode assembly 30 is disposed in the housing 40, and an electrolyte is filled in the housing 40. The battery cell 400 may be a cubic shape, a cuboid shape, or a cylindrical shape.

Based on actual use demands, a single electrode assembly 30 or a plurality of electrode assemblies 30 may be arranged. As shown in FIG. 1D, at least two separately wound electrode assemblies 30 may be alternatively arranged in the battery. A body portion of the electrode assembly 30 may be formed by winding or stacking a first electrode plate, a second electrode plate, and a separator between the first electrode plate and the second electrode plate that are adjacent, where the separator is an insulator between the first electrode plate and the second electrode plate that are adjacent. In this embodiment, for example, description is made by taking the first electrode plate as a positive electrode plate and the second electrode plate as a negative electrode plate. A positive electrode active material is applied on a coating zone of the positive electrode plate, and a negative electrode active material is applied on a coating zone of the negative electrode plate. A plurality of uncoated zones extended from the coating zone of the body portion are stacked as a tab. The electrode assembly 30 includes two tabs 301, that is, a positive tab and a negative tab. The positive tab is extended from the coating zone of the positive electrode plate, and the negative tab is extended from the coating zone of the negative electrode plate.

The end cap assembly 10 is disposed at the top of the electrode assembly 30. As shown in FIG. 1D, the end cap assembly 10 includes a top cap plate 10' and two electrode terminals 5. The two electrode terminals 5 are a positive electrode terminal and a positive electrode terminal respectively, a connecting member 20 is arranged respectively corresponding to each electrode terminal 5, and the connecting member 20 is located between the end cap 10' and the electrode assembly 30.

For example, the tabs 301 of the electrode assembly 30 in FIG. 1D are located on the top, the positive tab is connected to the positive electrode terminal through a connecting member 20, and the negative tab is connected to the negative electrode terminal through another connecting member 20. Optionally, the battery cell 400 may include two end cap assemblies 10, respectively arranged on two ends of the housing 40, and each end cap assembly 10 is provided with an electrode terminal 5.

The end cap plate 10' is also provided with an explosion-proof member, which, when there is too much gas in the battery cell 400, releases gas in the battery cell 400 in a timely manner to avoid explosion.

The end cap plate 10' is provided with an exhaust hole, and the exhaust hole may be located in the middle of the end cap 10' in the length direction. The explosion-proof member includes a pressure relief mechanism 6 that is disposed above the exhaust hole. In normal state, the pressure relief mechanism 6 is hermetically installed in the exhaust hole. When the battery cell 400 expands and the barometric pressure in the shell rises beyond a preset value, the pressure relief mechanism 6 is actuated to open, so that the gas is released outward through the pressure relief mechanism 6.

The pressure relief mechanism 6 refers to an element or a component that can be actuated to release internal pressure and/or internal substances when the internal pressure or internal temperature of the battery cell 400 reaches a predetermined threshold. The pressure relief mechanism 6 may specifically use a form of an explosion-proof valve, a gas valve, a pressure relief valve, a safety valve, or the like, and may specifically employ a pressure-sensitive or temperature-sensitive element or structure, that is, when the internal pressure or temperature of the battery cell 400 reaches a predetermined threshold, the pressure relief mechanism 6 performs action or a weak structure provided in the pressure relief mechanism 6 is broken, so that an opening or channel for releasing the internal pressure is formed. The threshold referred to in this application may be a pressure threshold or a temperature threshold. Design of the threshold varies according to different design requirements. For example, the threshold may be designed or determined based on an internal pressure or internal temperature of a battery cell 400 that is considered to be dangerous or at a risk of losing control. In addition, the threshold may depend on, for example, a material used in one or more of the positive electrode plate, the negative electrode plate, the electrolyte and the separator in the battery cell 400.

The "actuated" mentioned in this application means that the pressure relief mechanism 6 produces action or is activated to a specified state, so that the internal pressure of the battery cell 400 can be released. The action produced by the pressure relief mechanism 6 may include, but is not limited to: at least part of the pressure relief mechanism 6 is cracked, broken, torn or opened, or the like. When the pressure relief mechanism 6 is actuated, the high-temperature and high-pressure substances in the battery cell 400 are discharged as emissions from an actuated site. In this way, the pressure of the battery cell 400 can be released when the pressure or temperature is controllable, thereby avoiding potentially more serious accidents. The emissions from the battery cell 400 that are mentioned in this application include, but are not limited to: an electrolyte, fragments of the positive electrode plate, negative electrode plate and separator that are dissolved or split, high-temperature and high-pressure gas and flame generated by the reaction, and the like. The high-temperature and high-pressure emissions is discharged toward a direction in which the pressure relief mechanism 6 of the battery cell 400 is provided, and more specifically, may be discharged toward a zone at which the pressure relief mechanism 6 is actuated. The force and destructive power of such emissions may be great, and may even be enough to break through one or more structures in that direction.

In some embodiments, as shown in FIG. 1D, the end cap plate 10' is provided with a through-hole for injecting an electrolyte into the battery cell 400. The through-hole may be a round hole, an elliptical hole, a polygonal hole or a hole of another shape, and can extend in a height direction of the end cap plate 10'. The end cap plate 10' is provided with a liquid injection member 2 for closing the through-hole.

Figure 2:
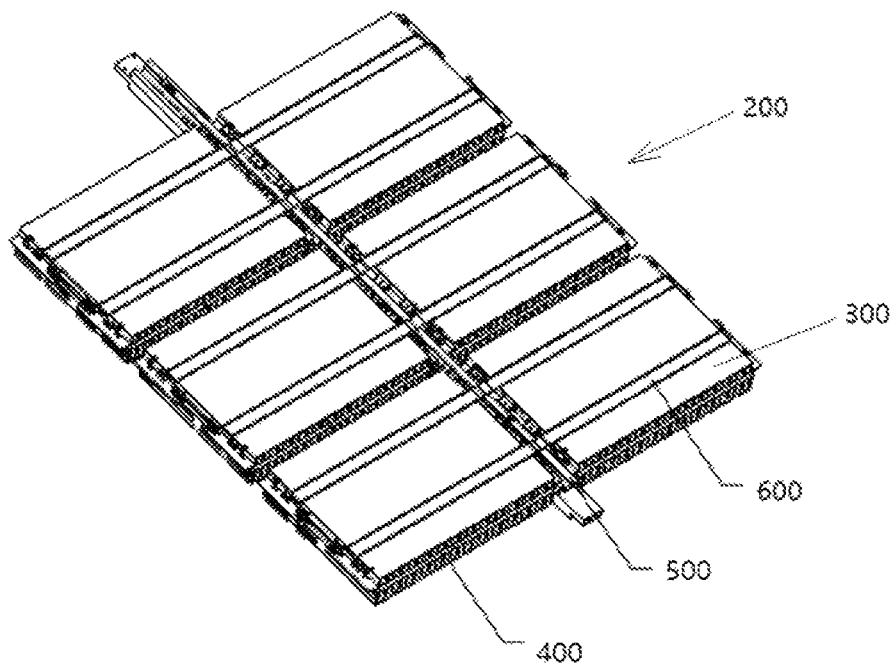
FIG. 2 is a schematic structural diagram showing an interior of a battery box body according to an embodiment of this application.

As shown in FIG. 2, the battery 200 provided in this embodiment of this application includes battery cells 400, a collection pipe 500, and firefighting pipes 600, where, as described above, the battery cell 400 is provided with a pressure relief mechanism 6, and the pressure relief mechanism 6 is configured to be actuated when internal pressure or temperature in the battery cell 400 reaches a threshold, to release the internal pressure, preventing accidents such as explosion from occurring on the battery cell 400.

In this embodiment of this application, the collection pipe 500 is configured to accommodate a firefighting medium, so as to provide the firefighting medium for the firefighting pipe 600 when the firefighting pipe 600 needs to be used. The firefighting pipe 600 is connected to the collection pipe 500 to allow the firefighting medium to be fed to the firefighting pipe 600, where the firefighting pipe 600 is configured to discharge the firefighting medium toward the battery cell 400 when the pressure relief mechanism 6 is actuated, to achieve the firefighting purpose and prevent or delay explosion or firing of the battery cell 400.

Figure 3:
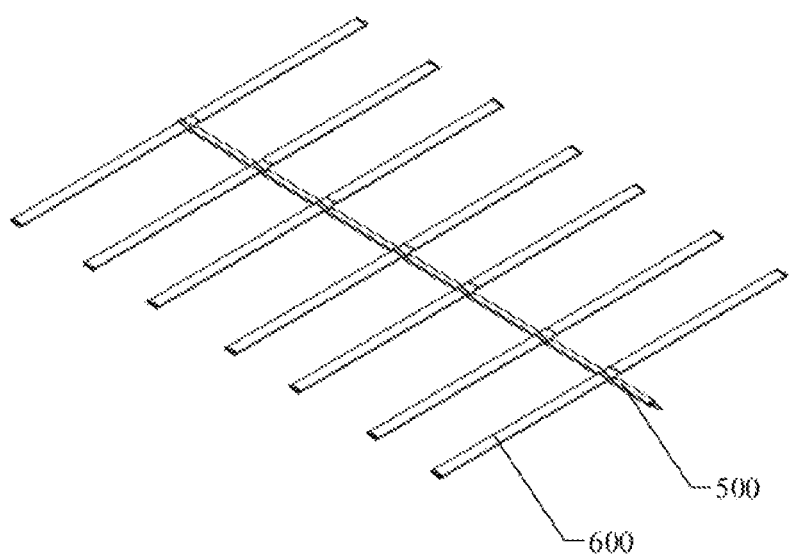
FIG. 3 is a schematic structural diagram of a collection pipe and firefighting pipes according to an embodiment of this application.
Figure 4:
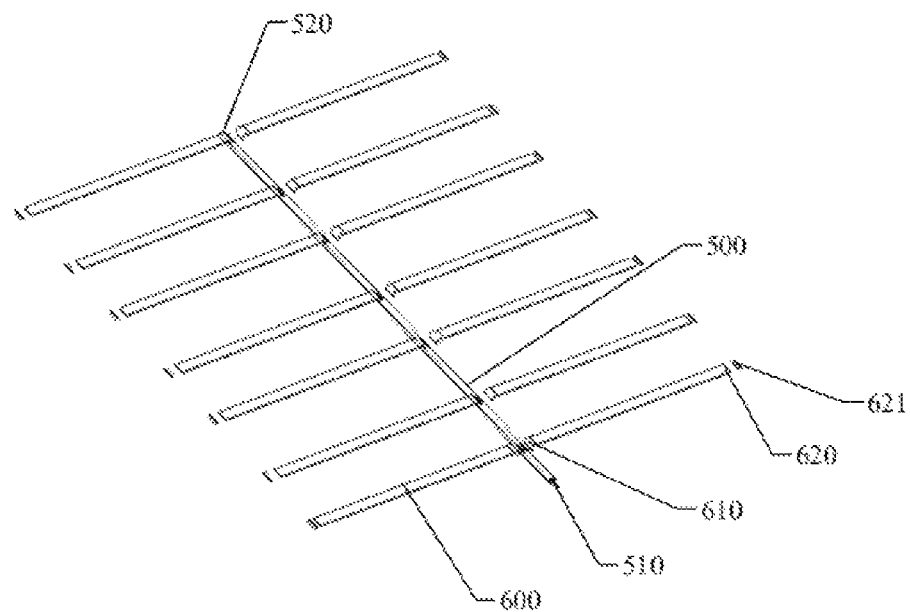
FIG. 4 is an exploded schematic structural diagram of a collection pipe and firefighting pipes according to an embodiment of this application.

As shown in FIG. 3 and FIG. 4, in this embodiment of this application, two ends of the firefighting pipe 600 are a first end 610 and a second end 620 respectively, the first end 610 is configured to connect to the collection pipe 500 to allow the firefighting medium to enter the firefighting pipe 600 through the first end 610. The second end 620 is closed, so that the firefighting medium entering the firefighting pipe 600 cannot be circulated in the firefighting pipe 600 before the pressure relief mechanism 6 is actuated. This may avoid a decrease in temperature of the pipe wall of the firefighting pipe 600 caused by circulation of the firefighting medium, and therefore, it is not prone to produce condensed water on the pipe wall of the firefighting pipe 600, thereby reducing a probability of short circuit in the battery cell 400 caused by the condensed water.

In this embodiment of this application, closing the second end 620 of the firefighting pipe 600 can prevent the firefighting medium from circulating in the firefighting pipe 600 when the pressure relief mechanism 6 is not actuated, thereby preventing the pipe wall of the firefighting pipe 600 from being cooled down during circulation of the firefighting medium, that is, a decrease in temperature of the pipe wall of the firefighting pipe 600. In this way, the temperature of the pipe wall of the firefighting pipe 600 is basically the same as the temperature inside the battery, so it is not prone to produce excessive condensed water on the pipe wall of the firefighting pipe 600, thereby solving a problem of short circuit of the battery cell 400 caused by the condensed water, and prolonging service life of the battery 200.

In this embodiment of this application, the firefighting medium is accommodated in the collection pipe 500, and the collection pipe 500 is connected to the first end 610 of the firefighting pipe 600, so that when the firefighting pipe 600 needs to use the firefighting medium, for example, when the pressure relief mechanism 6 is actuated and the firefighting medium in the firefighting pipe 600 needs to be discharged toward the battery cell 400, the firefighting medium can flow to the firefighting pipe 600 through the collection pipe 500 for firefighting use.

It should be noted that due to the arrangement of the collection pipe 500, initially, there is no firefighting medium in the firefighting pipe 600, which not only resolves the problem of condensed water produced on the pipe wall, but also helps to reduce the internal pressure of the firefighting pipe 600, so that when the pressure relief mechanism 6 is actuated, the firefighting pipe 600 is more likely to be broken, facilitating the firefighting medium to flow out in a timely manner, and improving firefighting timeliness.

In practical applications, when the firefighting pipe 600 is broken, the internal pressure of the firefighting pipe 600 is released. In this case, the firefighting medium in the collection pipe 500 soon flows into the firefighting pipe 600, so as to be used to achieve firefighting effects on the battery cell 400.

In this embodiment of this application, during installation of the firefighting pipe 600, gas with a preset pressure can be introduced into the firefighting pipe 600, or the firefighting pipe 600 can be made higher than the collection pipe 500 in a direction of gravity, so that when the pressure relief mechanism 6 is not actuated, the firefighting medium is blocked in the collection pipe 500, and therefore the firefighting medium is mainly concentrated in the collection pipe 500. In a case that no firefighting medium exists in the firefighting pipe 600, it is conducive for the firefighting pipe 600 to be broken by the emissions from the battery cell 400, helping firefighting in a timely manner and reducing occurrence of accidents.

In this embodiment of this application, by introducing the gas with a preset pressure into the firefighting pipe 600, or arranging the firefighting pipe 600 to be higher than the collection pipe 500 in the direction of gravity, which are described above, when the firefighting pipe 600 is broken, the firefighting medium can be delivered to the firefighting pipe 600 to satisfy firefighting demands.

In practical applications, the gas with a preset pressure may be an inert gas such as nitrogen. The preset pressure may be a pressure that make the firefighting medium be concentrated in the collection pipe 500, and a specific pressure strength is not particularly limited in this embodiment of this application.

It should be noted that initially, the firefighting pipe 600 is not strictly without any firefighting medium, and in practical applications, provided that an amount of the firefighting medium in the firefighting pipe 600 is small, the effect of being conducive to break can be achieved.

In this embodiment of this application, as shown in FIG. 4, in a case that the firefighting pipe 600 is arranged to be higher than the collection pipe 500 in a direction of gravity, the first end 610 of the firefighting pipe 600 needs to undergo bending processing, to facilitate connection with the collection pipe 500. A specific bending angle can be set based on an actual need, and this is not particularly limited in this embodiment of this application.

In the battery 200 provided in this embodiment of this application, in one aspect, the collection pipe 500 is arranged such that the firefighting medium can be accommodated in the collection pipe 500, and the first end 610 of the firefighting pipe 600 is connected to the collection pipe 500 to allow the firefighting medium to be fed to firefighting pipe 600 when firefighting is required, and this may not only implement firefighting, but also facilitate breakage of the firefighting pipe 600 when the pressure relief mechanism 6 is actuated, thereby improving firefighting timeliness. In another aspect, closure of the second end 620 of the firefighting pipe 600 can prevent the firefighting medium from circulating in the firefighting pipe 600 when the pressure relief mechanism 6 is not actuated, thereby reducing temperature difference between inside and outside temperatures of the firefighting pipe 600, and reducing condensed water produced on the exterior of the pipe wall of the firefighting pipe 600, to resolve the problem of short circuit in the battery cell 400 caused by the condensed water, which can prolong service life of the battery 200.

In practical applications, the firefighting medium may be a liquid firefighting medium or a gas firefighting medium, such as water, carbon dioxide, nitrogen, other flame-retardant liquids, gases, or the like. Any liquid or gas that can achieve a firefighting effect falls within the protection scope of the embodiments of this application.

In this embodiment of this application, both the collection pipe 500 and the firefighting pipe 600 are elongated pipes, and cross-sections of the collection pipe 500 and the firefighting pipe 600 may be in a square shape, a round shape, a semi-circular shape, a polygonal shape that is combined by the foregoing shapes, or other shapes. This is not particularly limited in this embodiment of this application. A size of the collection pipe 500 and the firefighting pipe 600 may be determined based on an actual size of the battery 200, and this is not particularly limited in this embodiment of this application.

In practical applications, there are many ways for the second end 620 to be closed. For example, the second end 620 is directly integrated with the main body of the firefighting pipe 600 so that the firefighting pipe 600 only opens at the first end 610.

In this embodiment of this application, s as shown in FIG. 4, the second end 620 of the firefighting pipe 600 is closed by using a first closure cap 621.

In this embodiment of this application, the second end 620 is closed by using the first closure cap 621. This not only plays the role of closing the second end 620, but also helps to clean up the residual substances inside the firefighting pipe 600 to prevent the residue from thickening the pipe wall of the firefighting pipe 600, which in turn, affects breakage of the firefighting pipe 600 in a timely manner during firefighting.

In practical applications, there are many structural forms of first closure caps 621. Such a first closure cap can hermetically close the second end 620 and is also easy to be removed, and this is not particularly limited in this embodiment of this application.

For example, in this embodiment of this application, the second end 620 has an opening, the first closure cap 621 includes an end wall and a side wall that are joined, the end wall is configured to block the opening, the side wall is arranged around the periphery of the opening, and the side wall is configured to hermetically engage with a pipe wall of the second end 620 to seal the opening, where the hermetic engagement can be welding or bonding.

In this embodiment of this application, the first closure cap 621 is configured to include an end wall and a side wall that are joined, and the opening is blocked by the end wall, so that when the pressure relief mechanism 6 is not actuated, the firefighting medium can be blocked in the firefighting pipe 600. The side wall is arranged around the periphery of the opening and hermetically engaged with the pipe wall of the second end 620 to achieve the purpose of sealing the opening, thereby closing the second end 620 and preventing the firefighting medium from circulating.

In this embodiment of this application, the firefighting pipe 600 is configured to be broken by emissions from the battery cell 400 when the pressure relief mechanism 6 is actuated, so that the firefighting medium is discharged and enters the battery cell 400 through the pressure relief mechanism 6. Therefore, when the battery 200 fails, the barometric pressure in the battery cell 400 rises beyond a preset value, and the high-temperature and high-pressure substances in the battery cell 400 are discharged as emissions from an actuated site of the pressure relief mechanism 6, the above-mentioned high temperature and high-pressure emissions may break a part of the firefighting pipe 600 disposed facing the pressure relief mechanism 6, thereby facilitating the firefighting medium to flow out in a timely manner and flow into the battery cell 400 through the pressure relief mechanism 6, so as to implement firefighting in the battery cell 400. In some embodiments, it is also possible to control the discharge of firefighting medium from the firefighting pipe 600 by valve switching.

In this embodiment of this application, by using the high-temperature and high-pressure emissions spewed from the inside of the battery cell 400 to break the firefighting pipe 600, for example, the breakage may be melt-through, so that precise firefighting can be achieved for the failed battery cell 400. Because only a site of the firefighting pipe 600 facing the failed battery cell 400 is broken to form a broken port, so that the firefighting medium can flow intensively to this site to achieve a better firefighting effect.

In practical applications, because only a portion of the firefighting medium discharged from the firefighting pipe 600 can enter the battery cell 400 from the pressure relief mechanism 6, the foregoing manner of precise firefighting in this embodiment of this application can improve utilization of the firefighting medium, achieving a better firefighting effect.

In this embodiment of this application, to facilitate the breakage of the firefighting pipe 600 to form a broken port, the firefighting pipe 600 has a weak portion, and the weak portion is configured to be broken by the emissions when the pressure relief mechanism 6 is actuated, which is conducive to discharge of the firefighting medium from the weak portion, thereby achieving the firefighting purpose.

In this embodiment of this application, a weak portion is arranged on the firefighting pipe 600, which helps more quickly break the firefighting pipe 600 by the high-temperature and high-pressure emissions spewed from the inside of the battery cell 400, improving firefighting timeliness.

In practical applications, the site of the weak portion can be arranged as required. For example, a side of the firefighting pipe 600 close to the battery cell 400 can be entirely arranged as the weak portion, or only a site opposite to the pressure relief mechanism 6 of each battery cell 400 may be arranged as the weak portion. Regardless of the site arrangement manner, it is only required that the emissions from the inside of the battery cell 400 is spewed on the weak portion when the pressure relief mechanism 6 is actuated.

In this embodiment of this application, the weak portion may be weak in terms of structure, for example, the weak portion is thinner than other sites of the firefighting pipe 600 in thickness; or, the weak portion may be weak in terms of material, for example, the material of the weak portion may be a material that is conducive to be broken by the high-temperature and high-pressure emissions spewed from the inside of the battery cell 400; or the strength of the weak portion may be lower than the strength of other sites of the firefighting pipe 600. This is not particularly limited in this embodiment of this application.

In practical applications, generally, a plurality of battery cells 400 need to be provided in a battery 200, and the plurality of battery cells 400 may be electrically connected in series, parallel, or series and parallel to form a battery module 300.

In this embodiment of this application, a plurality of battery cells 400 are arranged as at least two battery modules 300, each of the battery modules 300 includes at least one battery cell 400, and the pressure relief mechanism 6 of the battery cell 400 in each battery module 300 is disposed facing one of the firefighting pipes 600.

Figure 5:
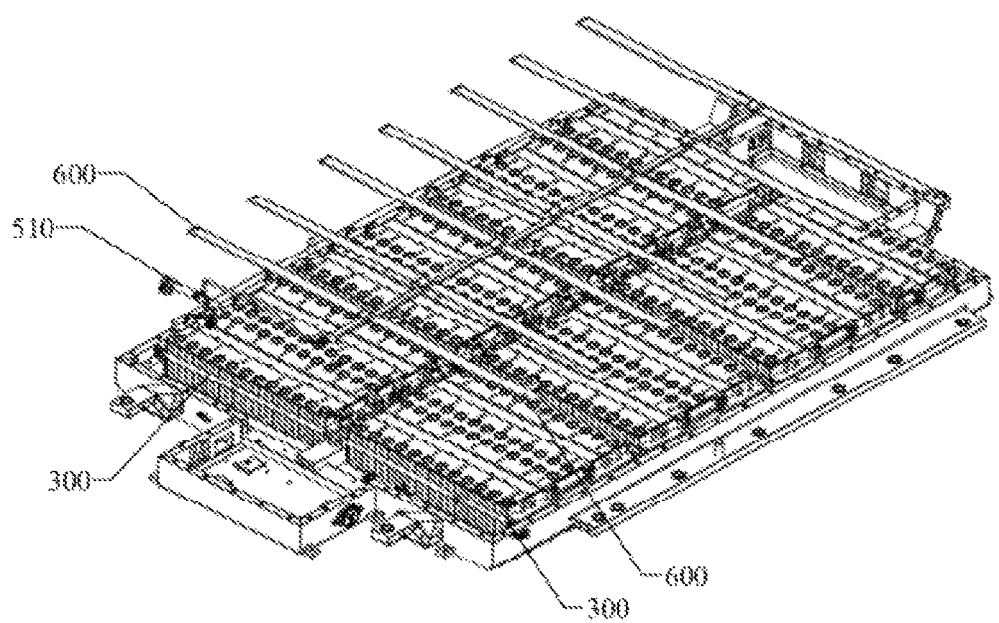
FIG. 5 is a schematic structural diagram showing location of a firefighting system in a battery according to an embodiment of this application.

As shown in FIG. 5, one battery module 300 corresponds to one firefighting pipe 600, and the pressure relief mechanisms 6 of the battery cells 400 in the battery module 300 are all disposed facing the same firefighting pipe 600, so that the same firefighting pipe 600 may be used for firefighting on the plurality of battery cells 400 in the same battery module 300, thereby reducing the number of firefighting pipes 600 and saving costs.

In this embodiment of this application, at least two battery modules 300 are respectively provided with firefighting pipes 600, and the foregoing two firefighting pipes 600 can also be connected to a same collection pipe 500, thereby reducing the number of collection pipes 500, simplifying the structure, and saving costs.

Figure 6:
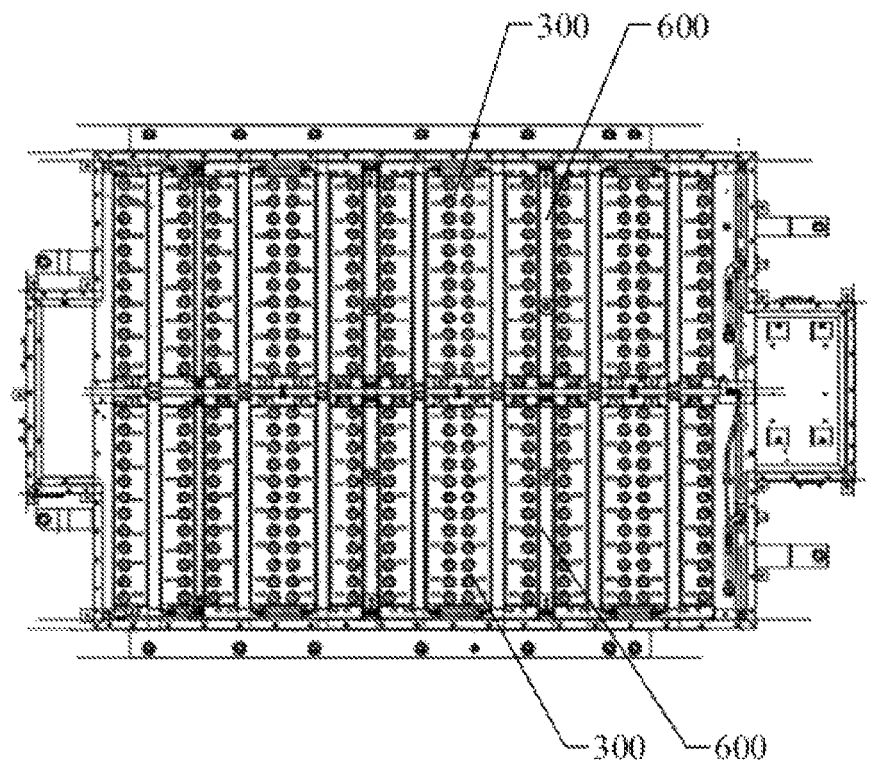
FIG. 6 is a top view showing a firefighting system according to an embodiment of this application.

In practical applications, in order to save space of the battery 200, the collection pipe 500 may be arranged between two adjacent battery modules 300. For example, as shown in FIG. 6, there are seven pairs of battery modules 300, each pair of battery modules 300 are arranged side by side, a battery module 300 corresponds to a firefighting pipe 600, and the seven pairs of battery modules 300 correspond to seven pairs of firefighting pipes 600. There is only one collection pipe 500 arranged between each pair of battery modules 300. A pair of firefighting pipes 600 are each arranged on two sides of the collection pipe 500, and seven pairs of firefighting pipes 600 are arranged spaced apart from each other on two sides of the collection pipe 500. Therefore, the collection pipe 500 and the plurality of firefighting pipes 600 are connected to form a fishbone structure as shown in FIG. 3, where the fishbone structure can be formed with a plurality of firefighting pipes 600 that are connected spaced apart from each other on two sides of the collection pipe 500. The firefighting pipes 600 are at an included angle with the collection pipe 500, for example, the included angle is 90 degrees, that is, the firefighting pipes 600 and the collection pipe 500 are perpendicular to each other. Certainly, in some embodiments, a plurality of firefighting pipes 600 may be alternatively arranged on the same side of the collection pipe 500.

In this embodiment of this application, the collection pipe 500 and the plurality of firefighting pipes 600 are connected to form a fishbone structure, so that it is convenient for each firefighting pipe 600 to be directly connected to the collection pipe 500. When firefighting is required, the firefighting medium can be directly supplied from the collection pipe 500 to the firefighting pipe 600. This not only can improve firefighting timeliness, but also can save the firefighting medium.

The arrangement direction of the collection pipe 500 and the firefighting pipes 600 are described below by taking an arrangement direction of the plurality of battery cells 400 in the battery module 300 as an example.

In this embodiment of this application, one battery module 300 includes a plurality of battery cells 400 arranged in a predetermined direction, and a length direction of the firefighting pipe 600 coincides with the arrangement direction of the plurality of battery cells 400, so that the pressure relief mechanism 6 of each battery cell 400 is disposed facing the firefighting pipe 600, that is, one firefighting pipe 600 provides firefighting for a plurality of battery cells 400 in a battery module 300.

In the foregoing embodiment, a length direction of the firefighting pipe 600 coincides with an arrangement direction of the plurality of battery cells 400, but the collection pipe 500 is at an included angle with the arrangement direction of the plurality of battery cells 400, that is, a length direction of the collection pipe 500 is at a preset included angle with the length direction of the firefighting pipe 600.

In practical applications, the foregoing preset included angle may be 90 degrees, 88 degrees, or the like. In this embodiment of this application, as shown in FIG. 3, the firefighting pipe 600 is perpendicular to the collection pipe 500, and the included angle is 90 degrees.

In practical applications, because the firefighting pipes 600 are connected at two sides of the collection pipe 500, the collection pipe 500 can be arranged in a simple long strip structure without bending processing, and the processing is simple and convenient.

In this embodiment of this application, two ends of the collection pipe 500 are a third end 510 and a fourth end 520 respectively. As shown in FIG. 4 and FIG. 5, the third end 510 is used to input the firefighting medium, and the fourth end 520 is closed.

In practical applications, the third end 510 can be connected to a fire box (not shown in the figure) storing the firefighting medium, to input the firefighting medium into the collection pipe 500. After the firefighting medium fills the collection pipe 500, the connection with the fire box is disconnected. The fire box generally is disposed outside the battery 200, maintains a connected state with the collection pipe 500 so that when the firefighting medium in the collection pipe 500 flows into the firefighting pipes 600, the collection pipe 500 can be supplemented with the firefighting medium in a timely manner.

In another embodiment of this application, the third end 510 may be alternatively connected to a thermal management component, where the thermal management component is generally disposed at the bottom of the battery cell 400 and configured to adjust temperature of the battery cell 400, for example, the thermal management component is configured to lower or rise the temperature of the battery cell 400 to a preset temperature. In a case of cooling down or lower the temperature of the battery cell 400, the thermal management component is configured to accommodate a cooling fluid to lower the temperature of the plurality of battery cells 400. In this case, the thermal management component may also be called as a cooling component, a cooling system, a cooling plate, or the like, and the fluid accommodated therein may also be called as a cooling medium or cooling fluid, and more specifically, may be called as a cooling liquid or cooling gas. In addition, the thermal management component may further be configured to heat and rise the temperature of the plurality of battery cells 400, and this is not limited in this embodiment of this application. The thermal management component can be connected to the fire box, and the thermal management component uses the firefighting medium provided by the fire box to adjust the temperature of the battery cell 400. For example, the thermal management component and the fire box can form a circulation loop, the firefighting medium provided by the fire box circulates between the thermal management component and the fire box, and the thermal management component uses the circulating firefighting medium to adjust the temperature of the battery cell 400. For example, the third end 510 may be connected only to the thermal management component to receive the firefighting medium provided by the thermal management component, that is, the fire box provides the firefighting medium to the thermal management component, and the thermal management component then provides the firefighting medium to the third end 510, through which the firefighting medium is input into the collection pipe 500.

In another embodiment of this application, the third end 510, the thermal management component, and the fire box can be connected in three ways, that is, the fire box can provide the firefighting medium to both the third end 510 and the thermal management component. The fire box and the thermal management components can form a circulation loop or not.

In this embodiment of this application, closing the fourth end 520 can also function to prevent the firefighting medium that enters the collection pipe 500 from circulating when the pressure relief mechanism 6 is not actuated, thereby preventing the fire-fighting medium from lowering the temperature of the pipe wall of the collection pipe 500 through heat exchange during the circulation of the firefighting medium. Like the firefighting pipes 600, it is also not prone to produce condensed water on the pipe wall of the collection pipe 500, thereby reducing a probability of short circuit in the battery cell 400 caused by the condensed water.

In addition, the fourth end 520 of the collection pipe 500 is closed, and when the enclosed firefighting medium in the collection pipe 500 flows into the firefighting pipe 600, it is not circulated between the collection pipe 500 and the firefighting pipe 600, which can further reduce condensed water produced on the pipe wall of the firefighting pipe 600.

In practical applications, the fourth end 520 can be closed in many ways. For example, the fourth end 520 can be directly integrated with the main body of the collection pipe 500, or the fourth end 520 can be closed by using a second closure cap (not shown), for example, the way to close the fourth end 520 with the second closure cap can be welding or bonding.

In practical applications, there may be many structural forms of second closure caps. Such a second closure cap can hermetically close the fourth end 520 and is also easy to be removed, for example, the second closure cap can be the same as the first closure cap 621 in structure. The structure form of the second closure cap is not specifically limited in this embodiment of this application.

It should be also noted that the main body of the collection pipe 500 is further provided with a plurality of output ports, and each output port is configured to connect to the firefighting pipe 600 so that the firefighting medium can flow into the firefighting pipe 600 through the output port.

In this embodiment of this application, the fourth end 520 is closed by the second closure cap, which not only functions to close the fourth end 520, but also helps to clean up residues inside the collection pipe 500 to prevent the residues from blocking the output port, and affecting the flow of firefighting medium.

In practical applications, the collection pipe 500 and the firefighting pipes 600 can be fixed in the battery 200 in a plurality of manners. In this embodiment of this application, the following manner is described in detail as an example, but it is not the only limitation on the manner of fixing the collection pipe 500 and the firefighting pipes 600. Any manners that can fix the collection pipe 500 and the firefighting pipes 600 at set locations falls within the protection scope of this application.

Figure 7:
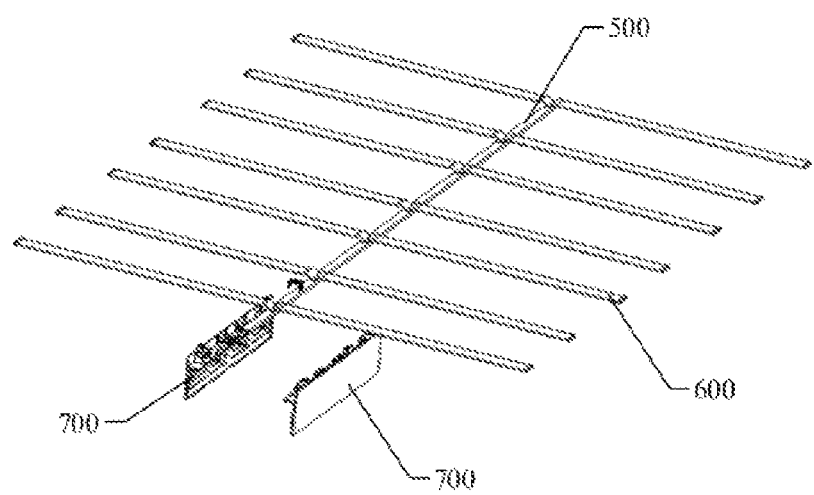
FIG. 7 is a schematic diagram showing a connection manner of a collection pipe according to an embodiment of this application.

As shown in FIG. 7, in this embodiment of this application, the battery 200 further includes a supporting member 700. The supporting member 700 is configured to support the collection pipe 500 to support the collection pipe 500 between adjacent battery modules 300 in a same row. For example, the battery 200 further includes a beam for supporting the battery module 300 and end plates for fixing a plurality of battery cells 400 into the battery module 300. For example, the beam is located between a row of adjacent battery modules 300 in a same row, and the end plates are located at two end of the plurality of battery cells 400 in an arrangement direction, and the two end plates are connected by a fixing band to combine the plurality of battery cells 400 into the battery module 300. The supporting member 700 may be supported on a beam or an end plate, or alternatively, the beam or the end plate can be directly used as the supporting member 700.

Figure 8:
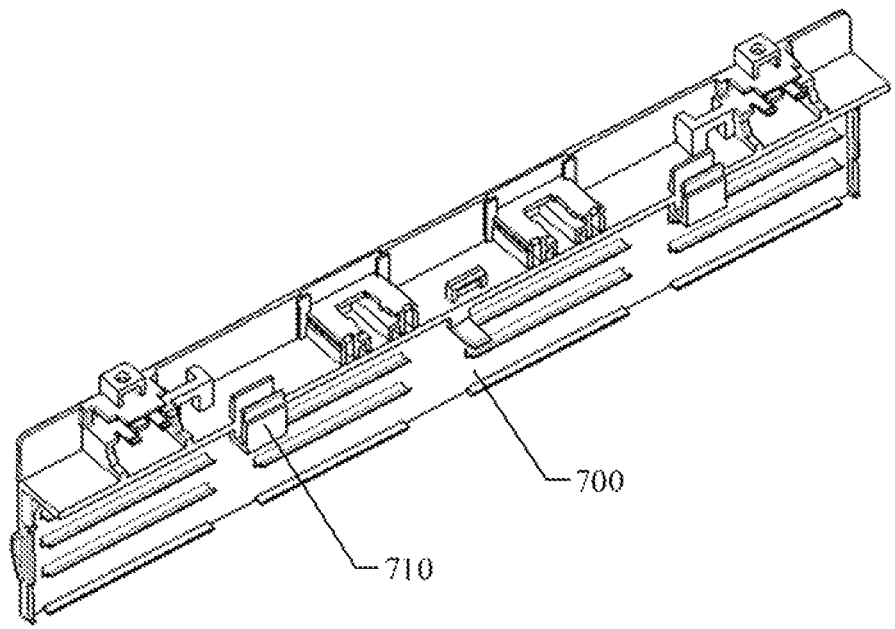
FIG. 8 is a schematic structural diagram of a supporting member according to an embodiment of this application.

As shown in FIG. 8, the supporting member 700 has a supporting arm 710, and the supporting arm 710 is configured to support the pipe wall of the collection pipe 500 facing the battery cell 400, to play a role in supporting the collection pipe 500. Taking the orientation in FIG. 9 as an example, the supporting arm 710 can restrict the collection pipe 500 from moving downward.

Figure 9:
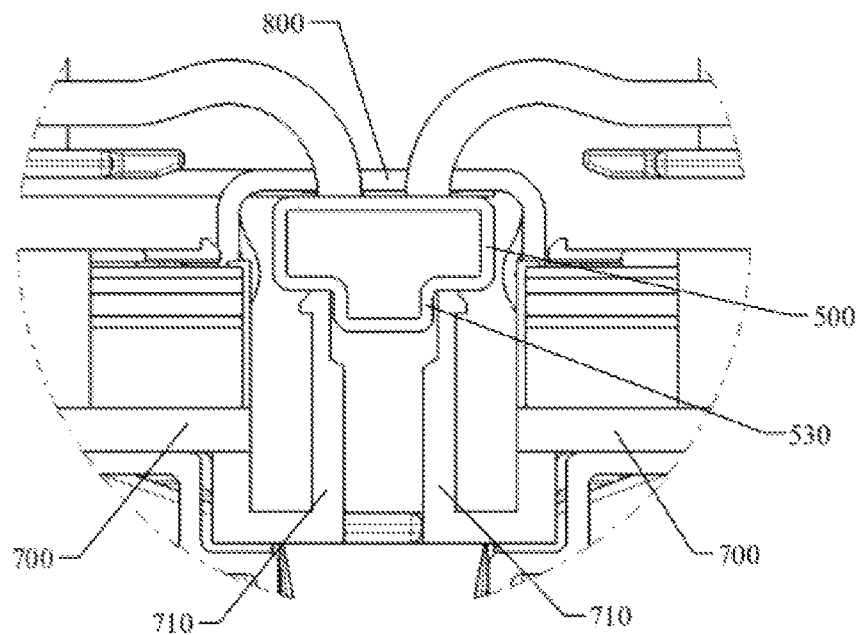
FIG. 9 is a partial front view showing a connection manner of a collection pipe according to an embodiment of this application.

As shown in FIG. 9, the supporting arms 710 are arranged in pairs in order to achieve the purpose of stably supporting the collection pipe 500.

Specifically, as shown in FIG. 7, a pair of supporting members 700 may be arranged, and each supporting member 700 is provided with a supporting arm 710, thereby forming a pair of supporting arms 710. In addition, a plurality of pairs of supporting arms 710 may be arranged spaced apart from each other along the length direction of the collection pipe 500, to support the collection pipe 500 at a set height. For example, the collection pipe 500 is horizontally disposed by using a plurality of pairs of supporting arms 710.

In this embodiment of this application, as shown in FIG. 9, the supporting arms 710 are arranged in pairs, and pairs of the supporting arms 710 are arranged spaced apart from each other, a protruding portion 530 is provided at the pipe wall of the collection pipe 500 facing the battery cell 400, the protruding portion 530 is configured to insert between pairs of the supporting arms 710, and pipe walls on two sides of the protruding portion 530 are supported by the pairs of the supporting arms 710. In another embodiment of this application, the supporting arm 710 can be directly supported on the pipe walls on both sides of the protruding portion 530 without being clamped on two side surfaces of the protruding portion 530, and the supporting arm 710 can also be clamped on two side surfaces of the protruding portion 530 and be supported on pipe walls on two sides of the protruding portion 530. In another embodiment of this application, the protruding portion 530 is formed by the pipe wall of the collection pipe 500 facing the battery cell 400, so an upper head of the protruding portion 530 faces the supporting arms 710. A groove is formed by the protruding portion 530 in the collection pipe 500, and the groove can accommodate the firefighting medium.

By inserting the protruding portion 530 between pairs of the supporting arms 710, stability provided by using the supporting arms 710 can be improved, preventing the collection pipe 500 from sliding on the supporting arms 710.

Figure 10:
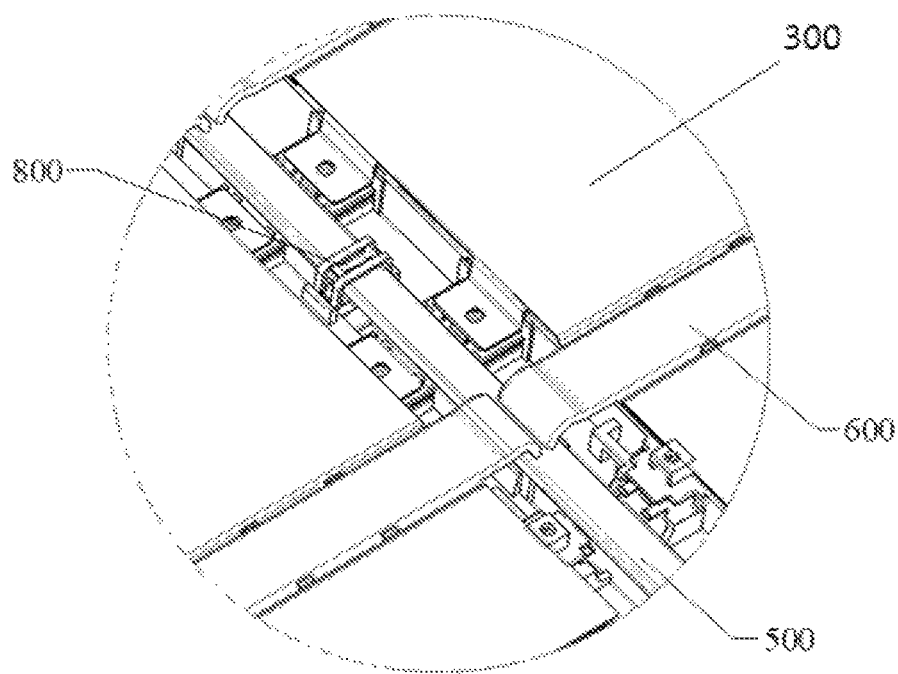
FIG. 10 is a partial schematic diagram showing a connection manner of a collection pipe according to an embodiment of this application.

In this embodiment of this application, as shown in FIG. 10, the battery 200 further includes a restraint member 800. The restraint member 800 is configured to restrict the collection pipe 500 in between adjacent battery modules 300, to restrict the collection pipe 500 from moving upward, leftward and rightward.

The restraint member 800 includes a restraint wall 810 and legs 820 connected to the restraint wall 810. The restraint wall 810 is located on the collection pipe 500 and is configured to restrict the collection pipe 500 from moving in a direction leaving the battery cell 400, that is, moving upward as shown in the figure. The legs 820 are configured to support the restraint wall 810, and located at two sides of the collection pipe 500 to limit the collection pipe 500, that is, the legs 820 are located between the collection pipe 500 and the battery modules 300 to limit the collection pipe 500, preventing the collection pipe 500 from moving leftward or rightward.

Figure 11:
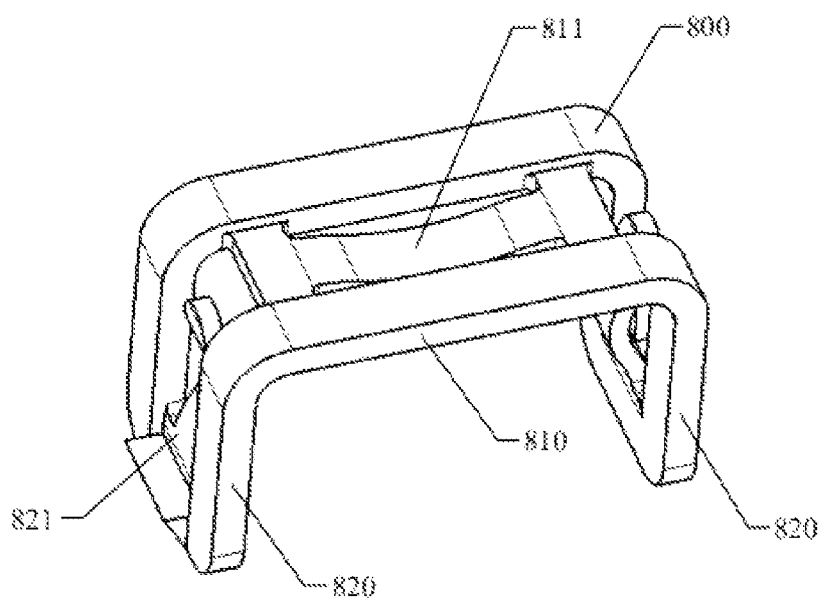
FIG. 11 is a schematic structural diagram showing a restraint member according to an embodiment of this application.

As shown in FIG. 11, the legs 820 are arranged in pairs, pairs of the legs 820 are arranged spaced apart from each other, and the collection pipe 500 is restricted in between pairs of the legs 820, to achieve the purpose of fixing the collection pipe 500. The restraint wall 810 and the legs 820 form an inverted-U shaped structure.

Further, the restraint wall 810 elastically abuts against the pipe wall of the collection pipe 500. For example, the restraint wall 810 has an arc portion 811, and the arc portion 811 protrudes toward the collection pipe 500 to elastically abut against the collection pipe 500, to restrict the collection pipe 500 from moving upward. For example, the restraint wall 810 is a hollow structure with a run-through restraint wall 810, the opening of the hollow structure faces the collection pipe 500, and the arc portion 811 is arranged in the hollow structure and connected to the restraint wall 810, for example, integrally formed and connected.

Further, the leg 820 is provided with a clamping portion 821, and the clamping portion 821 protrudes toward the collection pipe 500 to restrict the collection pipe 500, preventing the collection pipe 500 from moving leftward and rightward.

Specifically, the clamping portion 821 abuts against the pipe wall of the collection pipe 500 to play a role in fixing the collection pipe 500.

In practical applications, there may be many structural forms of the clamping portion 821. In this embodiment of this application, the clamping portion 821 is constructed as a cantilever structure. For example, one end of the clamping portion 821 may be fixed onto the leg 820, and the other end of the clamping portion 821 has an elastic arc buckle suspended, may not only elastically clamp the collection pipe 500, but also facilitate the restraint member 800 to clamp into the end plate or be detached from the end plate.

In the battery provided in this embodiment of this application, the supporting member 700 and the restraint member 800 jointly restrict and fix the collection pipe 500, which can restrict the collection pipe 500 from moving in space, thereby improving stability of the collection pipe 500.

Furthermore, this application further provides an electric apparatus, where the electric apparatus includes the foregoing battery 200, and the battery 200 is configured to provide electric energy. The specific structure form and working principle of the battery 200 have been described in detail in the foregoing embodiments, and are not repeated in this embodiment.

In conclusion, in the electric apparatus provided in this embodiment of this application, in one aspect, the foregoing battery is arranged, the collection pipe is arranged in the battery such that the firefighting medium can be accommodated in the collection pipe, and the first end of the firefighting pipe is connected to the collection pipe to allow the firefighting medium to be fed to the firefighting pipe when firefighting is required, and this may not only implement firefighting, but also facilitate breakage of the firefighting pipe when the pressure relief mechanism is actuated, thereby improving firefighting timeliness. In another aspect, closure of the second end of the firefighting pipe can prevent the firefighting medium from flowing in the firefighting pipe when the pressure relief mechanism is not actuated, thereby reducing a difference between inside and outside temperatures of the collection pipe, and reducing condensed water produced on the exterior of the pipe wall of the firefighting pipe, to resolve the problem of short circuit in the battery cell caused by the condensed water, which can prolong service life of the battery. In a further aspect, closure of the fourth end of the collection pipe can prevent the firefighting medium from flowing in the firefighting pipe when the pressure relief mechanism is not actuated, thereby reducing a difference between inside and outside temperatures of the collection pipe, and reducing condensed water produced on the exterior of the pipe wall of the collection pipe, to further resolve the problem of short circuit in the battery cell caused by the condensed water, which can further prolong service life of the battery. In addition, the supporting member and the restraint member jointly restrict and fix the collection pipe, and may restrict the collection pipe from moving in the space, thereby improving stability of the collection pipe.

The battery and the electric apparatus in the embodiments of this application are described above, and the method and the device for preparing a battery in the embodiment of this application will be described below. For the parts that are not described in detail, reference may be made to the foregoing embodiments.

Figure 12:
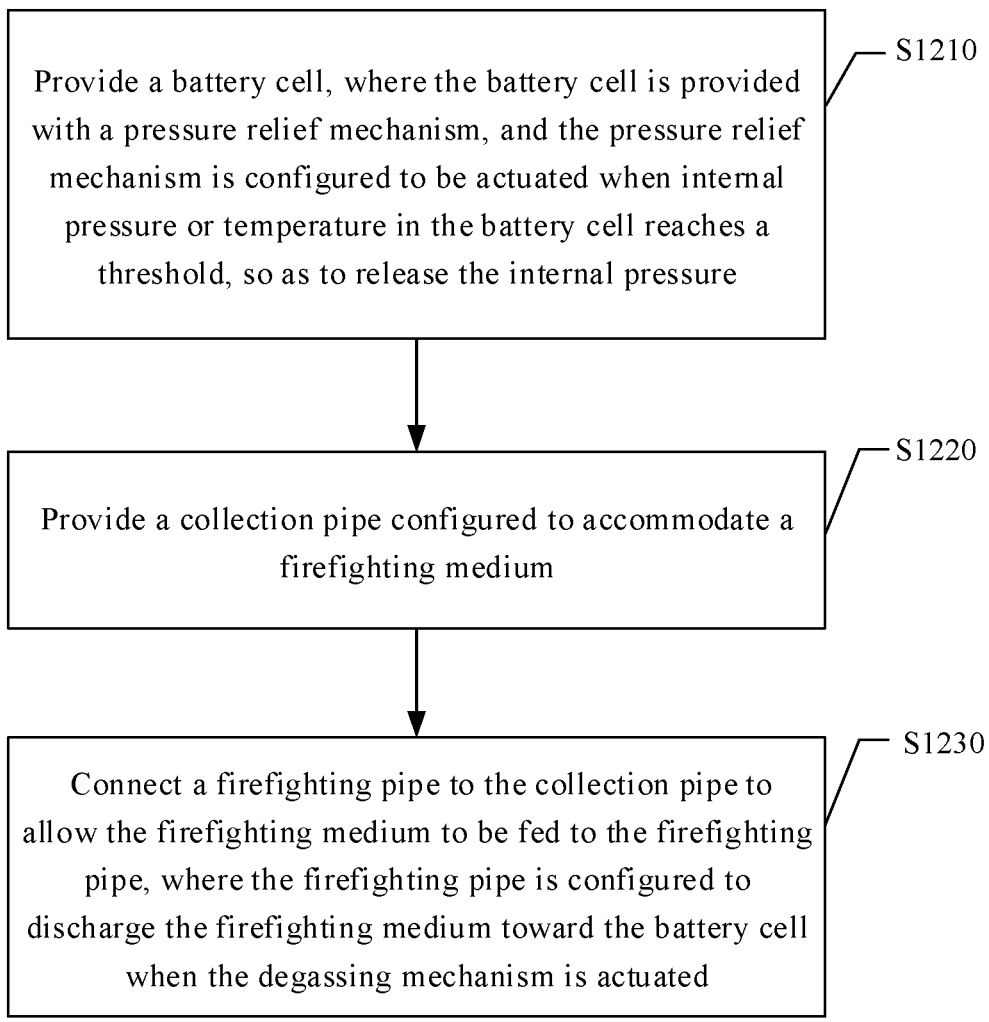
FIG. 12 is a flowchart of a method for preparing a battery according to an embodiment of this application.

Furthermore, an embodiment of this application further provides a method for preparing a battery. As shown in FIG. 12, the method for preparing a battery may include the following steps.

Step S1210: Provide a battery cell, where the battery cell is provided with a pressure relief mechanism, and the pressure relief mechanism is configured to be actuated when internal pressure or temperature in the battery cell reaches a threshold, to release the internal pressure.

Step S1220: Provide a collection pipe configured to accommodate a firefighting medium.

Step S1230: Connect a firefighting pipe to the collection pipe to allow the firefighting medium to be fed to the firefighting pipe, where the firefighting pipe is configured to discharge the firefighting medium toward the battery cell when the pressure relief mechanism is actuated.

Two ends of the firefighting pipe are a first end and a second end respectively, the first end is connected to the collection pipe to allow the firefighting medium to enter the firefighting pipe through the first end, and the second end is closed.

It can be learned from the embodiment of the battery 200 that the pressure relief mechanism 6 needs to be prepared on the battery cell 400, the firefighting pipe 600 can be fixed at a position facing the pressure relief mechanism 6, and the collection pipe 500 can be fixed between the battery modules 300.

It can be learned from the embodiment of the battery 200 that the battery 200 further includes other components, which can be manufactured by corresponding methods to finally obtain the desired battery 200. In practical applications, any methods for manufacturing related components and connecting the related components fall within the protection scope of the embodiments of this application, and details are not described herein in this embodiment of this application.

Figure 13:
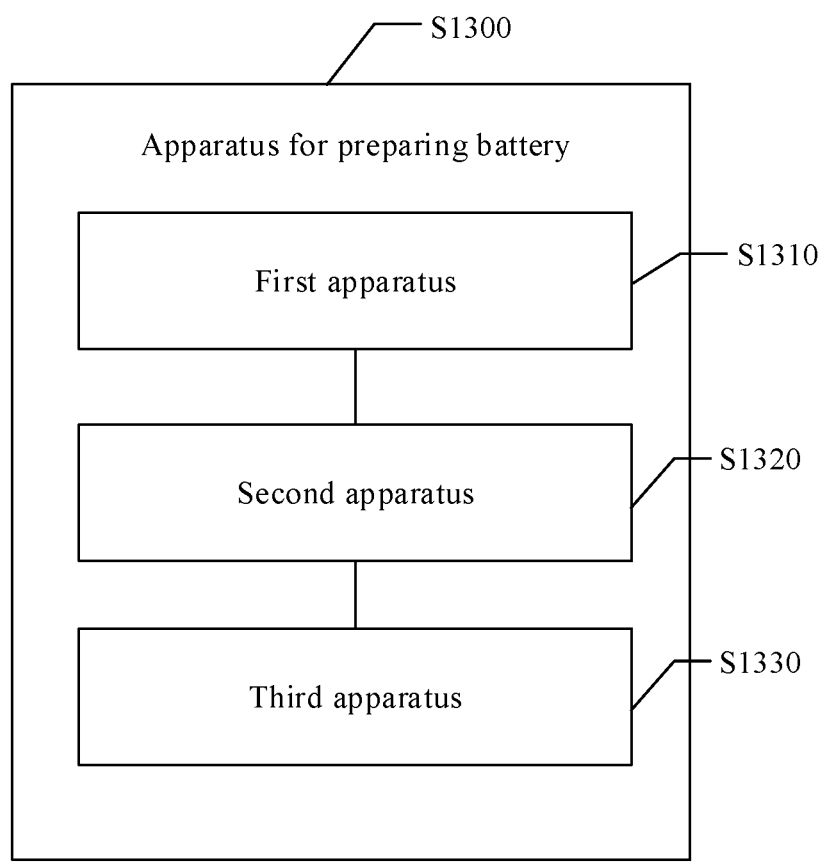
FIG. 13 is a block diagram of a device for preparing a battery according to an embodiment of this application.

Furthermore, an embodiment of this application further provides a device for preparing a battery. FIG. 13 is a block diagram of a device for manufacturing a battery according to an embodiment of this application. As shown in FIG. 13, the device 1300 for manufacturing a battery may include: a first apparatus 1310, a second apparatus 1320, and a third apparatus 1330.

The first apparatus 1310 may be configured to provide a battery cell, where the battery cell is provided with a pressure relief mechanism, and the pressure relief mechanism is configured to be actuated when internal pressure or temperature in the battery cell reaches a threshold, to release the internal pressure;

The second apparatus 1320 may be configured to provide a collection pipe configured to accommodate a firefighting medium.

The third apparatus 1330 may be configured to connect a firefighting pipe to the collection pipe to allow the firefighting medium to be fed to the firefighting pipe, where the firefighting pipe is configured to discharge the firefighting medium toward the battery cell when the pressure relief mechanism is actuated.

Two ends of the firefighting pipe are a first end and a second end respectively, the third apparatus 1330 may be configured to connect the first end with the collection pipe to allow the firefighting medium to enter the firefighting pipe through the first end, and the third apparatus 1330 may be further configured to close the second end.

Specific details of the foregoing devices for manufacturing a battery have already been described in detail in corresponding battery embodiments, and are not repeated herein.

Mutual reference may be made between features in the above protected subject matters and embodiments of this application. In a case that the structure permits, persons skilled in the art can also flexibly combine the technical features in different embodiments to form more embodiments.

The foregoing describes in detail a battery, an electric apparatus, a method for preparing a battery, and a device for preparing a battery. The principle and implementations of this application are described in this specification through specific embodiments. The descriptions about the embodiments are merely intended to help understand the methods and core ideas of this application. It should be noted that persons of ordinary skill in the art may make several improvements or modifications without departing from the principle of this application and the improvements and modifications of this application also fall within the scope of this application.

What is claimed is:

1. A battery comprising:
a battery cell, provided with a pressure relief mechanism configured to be actuated in response to internal pressure or temperature in the battery cell reaching a threshold, to release the internal pressure;
a collection pipe configured to accommodate a firefighting medium; and
a firefighting pipe configured to connect to the collection pipe to allow the firefighting medium to be fed to the firefighting pipe, the firefighting pipe being configured to discharge the firefighting medium toward the battery cell in response to the pressure relief mechanism being actuated;
wherein two ends of the firefighting pipe are a first end and a second end respectively, the first end is configured to connect to the collection pipe to allow the firefighting medium to enter the firefighting pipe through the first end, and the second end is closed, wherein the firefighting pipe is higher than the collection pipe in a direction of gravity, so as to block the firefighting medium in the collection pipe when the pressure relief mechanism is not actuated.

2. The battery according to claim 1, wherein the second end of the firefighting pipe is closed by a closure cap.

3. The battery according to claim 2, wherein the second end has an opening, the closure cap comprises an end wall and a side wall that are joined to each other, the end wall is configured to block the opening, the side wall is arranged around a periphery of the opening, and the side wall is configured to hermetically engage with a pipe wall of the second end to seal the opening.

4. The battery according to claim 1, wherein the firefighting pipe includes a weak portion configured to be broken by emissions from the battery cell in response to the pressure relief mechanism being actuated, to allow the firefighting medium to be discharged and enter the battery cell through the pressure relief mechanism.

5. The battery according to claim 1, wherein two ends of the collection pipe are a third end and a fourth end respectively, the third end is configured to allow the firefighting medium to enter the collection pipe through the third end, and the fourth end is closed by a closure cap.

6. The battery according to claim 1, further comprising:
a supporting member configured to support the collection pipe and including a pair of supporting arms spaced apart from each other, the pair of supporting arms being configured to support a pipe wall of the collection pipe facing the battery cell;
wherein a protruding portion is provided at the pipe wall of the collection pipe facing the battery cell, the protruding portion is configured to be arranged between the pair of supporting arms, and two sides of the protruding portion are supported by the pair of supporting arms.

7. The battery according to claim 1, wherein:
the firefighting pipe is one of a plurality of firefighting pipes arranged spaced apart from each other on one side or two sides of the collection pipe;
the battery cell is one of a plurality of battery cells each belonging to one of at least two battery modules, each of the battery modules comprising at least one battery cell of the plurality of battery cells, and the pressure relief mechanism of each of the at least one battery cell in one of the at least two battery modules facing a same one of the plurality of firefighting pipes;
one of the battery modules comprises two or more of the battery cells arranged in an arrangement direction same as a length direction of one of the firefighting pipes that corresponds to the one of the battery modules; and
a length direction of the collection pipe forms a preset included angle with the arrangement direction.

8. The battery according to claim 7, further comprising:
a restraint member configured to restrict the collection pipe between adjacent battery modules of the at least two battery modules;
wherein the restraint member comprises:
a restraint wall over the collection pipe and configured to restrict the collection pipe from moving in a direction leaving the battery cell; and
a leg connected to the restraint wall and configured to support the restraint wall, and located between the collection pipe and the adjacent battery modules to restrict the collection pipe;
wherein the leg is one of a pair of legs spaced apart from each other, and the collection pipe is restricted between the pair of legs.

9. The battery according to claim 8, wherein the restraint wall abuts against a pipe wall of the collection pipe, wherein the restraint wall has an arc portion, and the arc portion protrudes toward the collection pipe to abut against the pipe wall of the collection pipe.

10. The battery according to claim 8, wherein the leg is provided with a clamping portion, and the clamping portion protrudes toward the collection pipe to restrict the collection pipe, wherein the clamping portion abuts against a pipe wall of the collection pipe and/or is constructed as a cantilever structure.

11. The battery according to claim 8, wherein the leg is provided with a clamping portion, and the clamping portion protrudes toward the collection pipe to restrict the collection pipe, wherein the clamping portion is constructed as a cantilever structure.

12. The battery according to claim 1, further comprising:
a thermal management component configured to adjust temperature of the battery cell, the thermal management component being configured to connect to the collection pipe to allow the firefighting medium to be fed to the collection pipe.

13. An electric apparatus comprising:
a battery configured to provide electric energy, the battery including:
a battery cell, provided with a pressure relief mechanism configured to be actuated in response to internal pressure or temperature in the battery cell reaching a threshold, to release the internal pressure;
a collection pipe configured to accommodate a firefighting medium; and
a firefighting pipe configured to connect to the collection pipe to allow the firefighting medium to be fed to the firefighting pipe, the firefighting pipe being configured to discharge the firefighting medium toward the battery cell in response to the pressure relief mechanism being actuated;
wherein two ends of the firefighting pipe are a first end and a second end respectively, first end is configured to connect to the collection pipe to allow the firefighting medium to enter the firefighting pipe through the first end, and the second end is closed, wherein the firefighting pipe is higher than the collection pipe in a direction of gravity, so as to block the firefighting medium in the collection pipe when the pressure relief mechanism is not actuated.

14. A method for preparing a battery comprising:
providing a battery cell, the battery cell including a pressure relief mechanism configured to be actuated in response to internal pressure or temperature in the battery cell reaching a threshold, to release the internal pressure;
providing a collection pipe configured to accommodate a firefighting medium; and
connecting a firefighting pipe to the collection pipe to allow the firefighting medium to be fed to the firefighting pipe, the firefighting pipe is configured to discharge the firefighting medium toward the battery cell in response to the pressure relief mechanism being actuated, wherein the firefighting pipe is higher than the collection pipe in a direction of gravity, so as to block the firefighting medium in the collection pipe when the pressure relief mechanism is not actuated;
wherein two ends of the firefighting pipe are a first end and a second end respectively, the first end is configured to connect to the collection pipe to allow the firefighting medium to enter the firefighting pipe through the first end, and the second end is closed.

* * * * *